US009286744B2

(12) United States Patent
Montarou

(10) Patent No.: US 9,286,744 B2
(45) Date of Patent: Mar. 15, 2016

(54) MECHANICAL MODULE AND KEY

(76) Inventor: Laurent Montarou, Asnieres sur Seine (FR)

(*) Notice: Subject to any disclaimer, the term of this patent is extended or adjusted under 35 U.S.C. 154(b) by 377 days.

(21) Appl. No.: 13/514,583

(22) PCT Filed: Dec. 9, 2010

(86) PCT No.: PCT/EP2010/007487
§ 371 (c)(1),
(2), (4) Date: Nov. 5, 2012

(87) PCT Pub. No.: WO2011/069658
PCT Pub. Date: Jun. 16, 2011

(65) Prior Publication Data
US 2013/0044446 A1    Feb. 21, 2013

(30) Foreign Application Priority Data

Dec. 12, 2009 (DE) ............ 10 2009 058 122
Oct. 22, 2010 (FR) ..................... 10 04152

(51) Int. Cl.
| H02H 7/00 | (2006.01) |
| G07C 9/00 | (2006.01) |
| E05B 19/04 | (2006.01) |
| H01M 2/10 | (2006.01) |

(52) U.S. Cl.
CPC .......... *G07C 9/00944* (2013.01); *E05B 19/043* (2013.01); *H01M 2/1044* (2013.01)

(58) Field of Classification Search
CPC ................ H01M 2/10; G07C 2009/00992
USPC ......................... 361/752, 748, 758
See application file for complete search history.

(56) References Cited

U.S. PATENT DOCUMENTS

| 6,307,749 | B1* | 10/2001 | Daanen et al. ................. 361/704 |
| 2001/0017766 | A1* | 8/2001 | Murowaki et al. ............ 361/752 |
| 2002/0008610 | A1* | 1/2002 | Peterson .............. H01H 9/0214 340/5.64 |
| 2005/0048850 | A1* | 3/2005 | Zoller ................. B60R 16/0239 439/761 |
| 2005/0260883 | A1* | 11/2005 | Aihara et al. .................. 439/475 |
| 2006/0023442 | A1* | 2/2006 | De Los Santos et al. ..... 361/814 |
| 2006/0054484 | A1* | 3/2006 | Uleski ...................... G06G 1/02 200/341 |
| 2006/0144683 | A1* | 7/2006 | White et al. ................... 200/341 |

(Continued)

FOREIGN PATENT DOCUMENTS

| DE | 102006037790 A1 | 9/2007 |
| DE | 102007022300 A1 | 11/2008 |

(Continued)

OTHER PUBLICATIONS

International Search Report of PCT Application No. PCT/EP2010/007487 mailed Apr. 4, 2011.

(Continued)

*Primary Examiner* — Dion R Ferguson
*Assistant Examiner* — Mandeep S Buttar
(74) *Attorney, Agent, or Firm* — Fletcher Yoder, P.C.

(57) ABSTRACT

A mechanical module, such as for a vehicle comprises a body having a first body part and a second body part, a printed board and a battery. The first and second body parts are fixed mechanically relative to one another. The printed board is permanently fixed to the first body part. The battery is positioned between the printed board and the second body part, and the body is designed such that the battery can be exchanged without giving access to a compartment of the body between the printed board and the first part of the body.

7 Claims, 1 Drawing Sheet

(56) References Cited

U.S. PATENT DOCUMENTS

| | | |
|---|---|---|
| 2007/0024143 A1 * | 2/2007 | Acquaviva et al. ...... 310/156.32 |
| 2007/0223152 A1 | 9/2007 | Murakami et al. |
| 2007/0270013 A1 | 11/2007 | Clark |

FOREIGN PATENT DOCUMENTS

| | | |
|---|---|---|
| FR | 2815521 A1 | 9/2011 |
| JP | H10163888 | 6/1998 |
| JP | 2001339176 A | 12/2001 |
| JP | 2005223299 | 8/2005 |
| JP | 2009235683 A | 10/2009 |
| WO | 2007140119 A2 | 12/2007 |

OTHER PUBLICATIONS

French Written Opinion & Preliminary Report of FR Application No. FR1004152 mailed Sep. 30, 2011.
Written Opinion of the International Searching Authority of PCT Application No. PCT/EP2010/007487 mailed Jul. 12, 2012.
Japanese Office Action mailed Jul. 1, 2014.
Japanese Office Action mailed Apr. 7, 2015.

* cited by examiner

MECHANICAL MODULE AND KEY

CROSS REFERENCE TO RELATED APPLICATIONS

This application claims priority from and the benefit of PCT Application No. PCT/EP2010/007487, filed on Dec. 9, 2010; German Patent No. DE 10 2009 058 122.7, filed on Dec. 12, 2009; and French Patent FR 10/04152, filed on Oct. 22, 2010; which are herein incorporated by reference.

BACKGROUND

The present invention relates to a mechanical module, notably for a vehicle key, and to a key.

Vehicle keys are generally known. They are notably intended for example to lock or unlock the opening leaves of the vehicle, for example the doors, to operate a tailgate, an anti-theft device and/or a starter of the vehicle.

Moreover, vehicle keys are known, notably from French patent application FR 2 815 521 A1, which comprise a key body forming a casing for electronic means that remotely control the means of locking the opening leaves of the vehicle. The casing often comes in two parts, each of which forms approximately half of the casing. The casing may be designed in such a way that the two parts of the casing can be undone or in such a way that the two parts of the casing cannot be undone without destroying or at least damaging the casing. In that context, international patent application WO 2007/140119 A2 describes a car key with a casing, the casing being designed in two parts each forming approximately half of the casing, it being possible for the parts to be joined together in such a way that any separating of the parts can be subsequently detected.

Moreover, known keys comprise an insert mounted on the key body in such a way as to be capable of pivoting about an axis of rotation between firstly a position of use and secondly a stored position.

The key body may adopt varying shapes depending notably on the desired cosmetic effect.

One disadvantage with such keys according to the known art is the need to have to open up the key body when the battery housed inside the key body needs to be changed. In such a battery-exchange situation, the need to open the key body normally leads to the components of the printed board located inside the key body becoming accessible.

SUMMARY

It is a particular object of the present invention to address the disadvantages of the known art, notably those mentioned hereinabove, and another object of the present invention is to provide a mechanical module, notably for a vehicle key, which is relatively inexpensive but nonetheless makes it possible to avoid allowing the components located on the printed board to become accessible during battery exchange.

According to the invention, this objective is achieved using a mechanical module, notably for a key, comprising a body, the body comprising a first body part, a second body part, a printed board and a battery, the first and second body parts being fixed mechanically relative to one another, the printed board being fixed to the first body part by means of a permanent fixing, the battery being positioned between the printed board and the second body part, the body being designed such that the battery can be exchanged without giving access to the compartment of the body between the printed board and the first part of the body.

Thus it is advantageously possible to produce the casing of the mechanical module in such a way that the battery can be exchanged without giving access to the components on the printed board. Moreover, it is advantageously possible for the various elements of the key to be held in place when the key body is opened up, which opening becomes necessary when changing the battery.

A preferred enhancement of the invention is that the permanent fixing is a fixing using heading.

With such an embodiment it is advantageously possible to connect the printed board to the first part of the key body in a simple and effective way.

Another preferred enhancement of the invention is that the permanent fixing is a fixing using ultrasonic welding.

Another preferred enhancement of the invention is that the permanent fixing is a fixing using adhesive bonding.

Thus it is advantageously possible to produce a key assembly that affords protection to the components on the printed board of the key.

A preferred enhancement of the invention is that the mechanical module comprises at least one sealing element between the first body part and the printed board.

With such an embodiment, it is advantageously possible to avoid external influences, notably the influence of moisture.

Another preferred enhancement of the invention is that the module is a key module comprising an insert mounted on the body. For preference, the insert is capable of pivoting about an axis of rotation between a position of use and a stored position, the mechanical module preferably being of the type comprising a pivoting support bearing the insert and collaborating with an operating button.

Thus it is advantageously possible to produce simple and effective workings for the mechanical module of the key and to give the casing enough mechanical stability that such a key can be achieved.

A preferred enhancement of the invention is also that the first and second body parts being mechanically fixed one relative to the other at means of an assembly involving interlocking shapes, which means that the key body can be made very stable.

Moreover, the present invention also relates to a key, notably a vehicle key, the key comprising a mechanical module according to the present invention.

Other features and advantages of the invention will become apparent from reading the following description of one particular nonlimiting embodiment of the present invention.

DRAWINGS

The invention will be better understood from the following description which relates to some preferred embodiments given by way of nonlimiting example and explained with reference to the attached schematic drawings in which.

Figure 3:
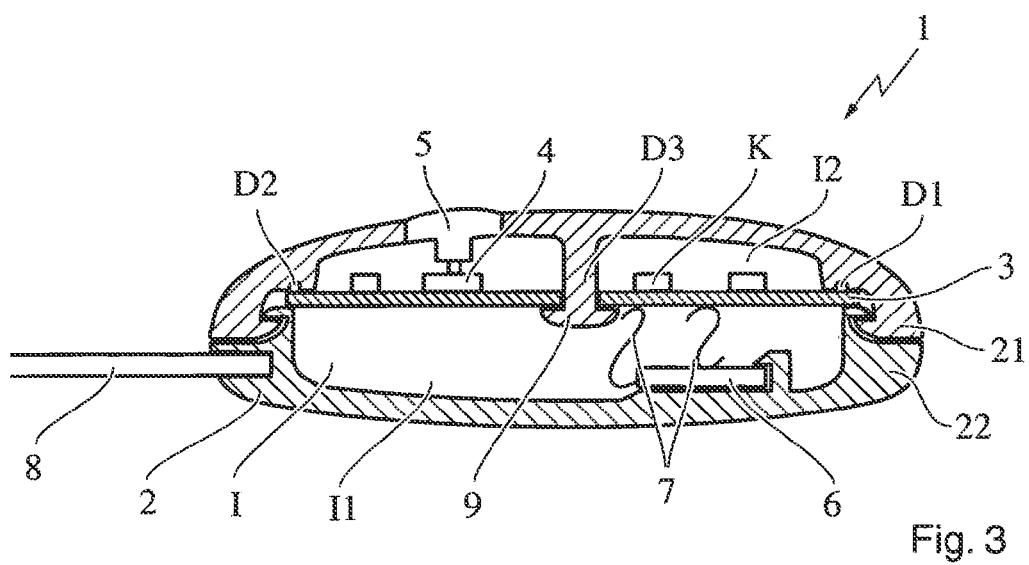

FIG. 3 schematically depicts a cross-sectional view of the mechanical key module comprising a first body part and a second body part according to the present invention.

DETAILED DESCRIPTION

Figure 1:
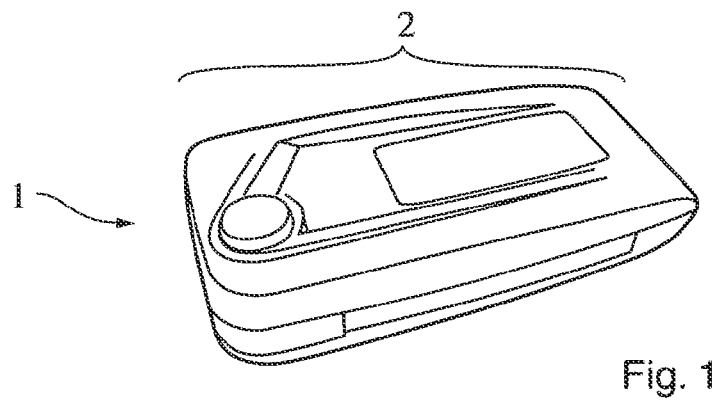
FIG. 1 is a schematic view of a vehicle key according to the present invention, the key by way of example comprising an insert and the insert being in a stored position.
Figure 2:
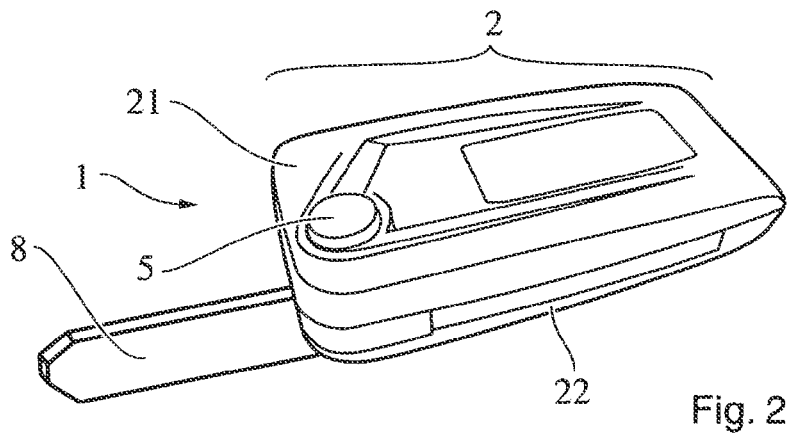
FIG. 2 is a schematic view of the vehicle key according to the present invention, the key by way of example comprising an insert and the insert being in a position of use.

FIGS. 1 and 2 of the attached drawings show by way of example a key 1 comprising a mechanical module according to the present invention. The key 1 is intended, for example, to lock or unlock the opening leaves of the vehicle, to operate an anti-theft device and a starter of this vehicle, etc. In the example depicted, the key 1 comprises a key body 2, in the overall shape of a yoke, comprising at least one first part 21 of a casing of the key body 2 and a second part 22 of a casing of the key body 2. The first and second parts 21, 22 are preferably produced by molding.

The key may comprise an insert 8 and an operating button 5 that brings about the rotary movements of the insert 8 with respect to the key body 2 about an imaginary axis of rotation (or of pivoting) of the insert 8 with respect to the key body 2. The insert 8, also known as the key-bit, is designed, for example, with a flat overall shape. The rotary movement about the axis of rotation allows the insert 8 to move between a stored position as illustrated notably in FIG. 1, and a position of use as illustrated notably in FIG. 2.

FIG. 3 is a schematic cross-sectional depiction of a casing or of a mechanical module comprising a first part 21 and a second part 22 according to the present invention.

The key body 2 comprises a printed board 3 with electronic elements or components K. The electronic elements or components K include conventional electronic means intended for example for the remote control of the means for locking the opening leaves of the vehicle or means of identifying a user authorized to use the vehicle. The printed board 3 is fixed to one of the parts 21, 22 of the key body 2 by means of a permanent fixing 9. In the example depicted in FIG. 3, the printed board 3 is fixed to the first body part 21. It is equally possible according to the present invention for the printed board 3 to be fixed to the second part 22 of the body 2.

By means of the permanent fixing 9 of the printed board 3 to the first body part 21, the whole of the inside of the key body 2 is divided:
firstly in to a compartment I2 between (a first face of) the printed board 3 and the first body part 21, and
secondly another compartment I1 between (a second face of) the printed board 3 and the second body part 22.

The electronic elements or components K (positioned on the printed board 3) are preferably housed in the compartment I2 and the battery 6 is housed in the other compartment I1.

It is preferable according to the present invention and as depicted in FIG. 3 for the compartment I2 to form a space that is sealed with respect to the outside of the key body 2, and also with respect to the other compartment I1. This sealing is achieved by means of sealing elements D1, D2, D3, for example elements made of an elastic material.

The permanent fixing 9 of the printed board 3 to the first body part 21 may be achieved through a heading process. This a low-temperature (normally up to 300° C.) welding method which provides an assembly of high mechanical quality, while at the same time providing a high quality appearance and high assembly repeatability.

According to another embodiment of the present invention, it is also possible for the permanent fixing 9 to be achieved by means of ultrasonic welding or using adhesive bonding.

The invention claimed is:

1. A mechanical module for a key, comprising:
a body, the body comprising a first body part, a second body part, a printed board, and a battery, the first and second body parts are fixed mechanically relative to one another, wherein the printed board is permanently fixed to the first body part via a permanent fixing element, an entire inside of the body is divided into a first compartment formed between a first face of the printed board and the first body part, and a second compartment formed between a second face of the printed board and the second body part, electronic components are disposed on the printed board and housed within the first compartment, and the battery is housed in the second compartment;
wherein the first compartment forms a first space that is sealed from an outside of the body and from the second compartment by a seal which is provided by a first sealing element, a second sealing element, and a third sealing element, wherein the first sealing element, the second sealing element, and the third sealing element are separate from one another, and the third sealing element comprises the permanent fixing element; wherein the permanent fixing element extends through the printed board, and the third sealing element provides a seal between the permanent fixing element and the printed board, wherein the permanent fixing element is integrally formed with the third sealing element to form a unitary body;
Wherein the electronic components are configured to remotely control objects; and
Wherein an electronic circuit positioned on the first face of the printed board is operatively coupled to an operating button, and the operating button is integrated into the first body part and configured to initiate rotary movement of an insert with respect to the body about an axis of rotation of the insert via the electronic circuit.

2. The mechanical module as claimed in claim 1, wherein the permanent fixing element permanently fixes the printed board to the first body part by heading.

3. The mechanical module as claimed in claim 1, wherein the permanent fixing element permanently fixes the printed board to the first body part by ultrasonic welding.

4. The mechanical module as claimed in claim 1, wherein the permanent fixing element permanently fixes the printed board to the first body part by adhesive bonding.

5. The mechanical module as claimed in claim 1, wherein at least one of the first sealing element, the second sealing element, and the third sealing element is disposed between the first body part and the printed board.

6. The mechanical module as claimed in claim 1, wherein the first and second body parts are mechanically fixed one relative to the other to form an interlocking assembly.

7. A vehicle key comprising a mechanical module as claimed in claim 1.

* * * * *